U. H. GOBLE.
Mowing Machine.

No. 10,323.

Patented Dec. 20, 1853.

UNITED STATES PATENT OFFICE.

URIAH H. GOBLE, OF SPRINGFIELD, OHIO.

IMPROVEMENT IN GRAIN AND GRASS HARVESTERS.

Specification forming part of Letters Patent No. 10,323, dated December 20, 1853.

*To all whom it may concern:*

Be it known that I, URIAH H. GOBLE, of Springfield, in the county of Clarke and State of Ohio, have invented certain new and useful Improvements in Harvesters or Machines for Cutting or Reaping Grain, Hemp, &c; and I do hereby declare the following to be a full, clear, and exact description of the same, reference being had to the accompanying drawings, making a part thereof, in which—

Figure 1:
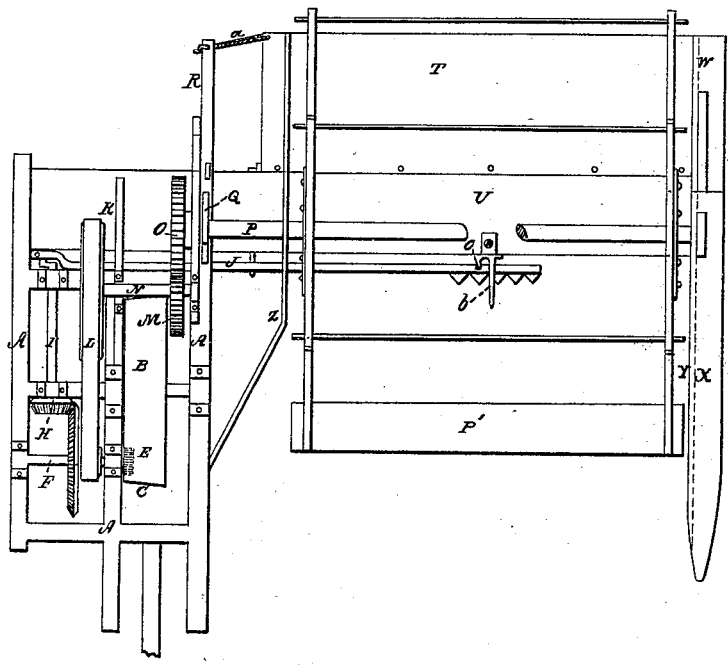
Figure 2:
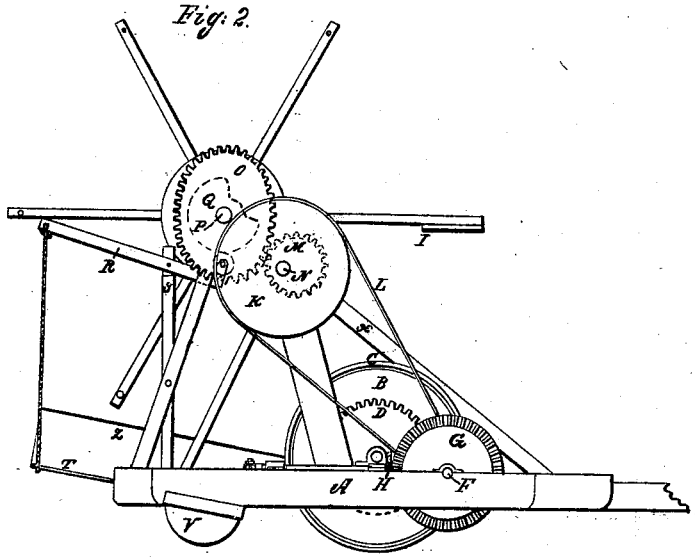

Figure 1 represents a top view. Fig. 2 represents a view from that end of the machine on which the driving machinery is arranged, and Fig. 3 a detached view of the guard and guide through which the cutter-bar vibrates.

Similar letters in the several figures denote like parts.

The nature of my invention consists, first, in making the driving or ground wheel conical, with the larger diameter next the grain, for the double purpose of throwing forward that end of the machine which is in the grain, and causing it to run out of the grain, as it were, its natural tendency being through leverage and the resistance of the standing grain to run into it, and also for balancing the machine by throwing the heft of the machine on the outside of the wheel and preventing the side draft, or counteracting it and causing the reaper to follow the line of draft; also, in leaving a space entirely around the cutter-bar where it passes through the guard or fingers, which space may be enlarged in rear of the bar, and supporting and guiding the bar in its reciprocating movement in guides or boxes intermediately placed between said guards or fingers, for the purpose of preventing the bar from clogging in the fingers and allowing it to clear itself of the gum, straw, or lint; also, in hinging an apron on the rear part of the platform in such manner that by means of a cam on the reel-shaft and a swing-lever, or their equivalents, said rear part of the platform may at stated periods be let down to facilitate the throwing off or delivering of the cut grain or other material from the platform.

To enable others skilled in the art to make and use my invention, I will proceed to describe the same with reference to the drawings.

The frame A, for carrying the driving machinery, may be made in any well known substantial manner, and the two may be so arranged as to adjust said frame to the supporting-wheel by raising or lowering it to cut the grain or other material higher from or nearer to the ground, as occasion may require.

The ground or driving wheel B, upon which the whole machine is mainly supported and balanced, has a conical tread, C, the larger diameter of which is next the uncut or standing grain. This is for the purpose of throwing forward that part of the machine which carries the cutters, &c., and prevents it from lagging or being drawn into the grain, and also causes the machine to move in the line of the draft, counteracting the side draft and balancing the machine by throwing the heft outside of said wheel or from the standing grain. In the outer face of said wheel B, or on the same shaft, and moving with it, is arranged the gear D, which drives a pinion, E, on the shaft F, which is supported in suitable boxes on the frame. On this shaft F is also arranged the bevel-gear G, which meshes with and gives motion to a smaller bevel-gear, H, on the shaft I, to the rear end of which shaft I is connected a crank for giving a reciprocating motion to the cutter-bar J.

A pulley is arranged on the shaft F, immediately inside of the bevel-gear G, over which and around the larger drum or pulley K passes an endless belt, L, for driving the pinion M, which is on the same shaft N with said pulley. The pinion M is placed eccentrically upon the shaft N, and gears with an elliptic wheel, O, on the end of the shaft P, which carries the reel. The object of the eccentric pinion M and the elliptic wheel O is to give a variable motion to the reel, or more especially to the scraping-board P', which sweeps the cut grain from the platform and deposits it in regular quantities at regular intervals in rear of the machine.

On the shaft P, which is the reel-shaft, is placed a cam, Q, (represented in red lines, Fig. 2,) against the face of which cam a friction-roller on the end of the lever R runs, said lever being pivoted in an upright piece, S, which forms its fulcra. To the rear of the lever R is attached a cord or chain, *a*, the lower end of which is attached to a hinged apron, T, connected to the rear of the platform U. As the shaft P revolves, it brings round the scraping-board P', and at this point of its revolution the recess in the cam comes opposite the roller on the lever R, into which it raises, dropping the rear of the lever, and also the apron attached to it, and the grain is swept off and drops to the ground. Just before the grain is swept from the platform the relative diameters of the eccentric and elliptic wheel change, the smaller portion or diameter of the first taking into the longer diameter of the second, which so slackens the speed of the reel as to gently sweep off the grain and not throw it, by which means it would become entangled.

Figure 3:
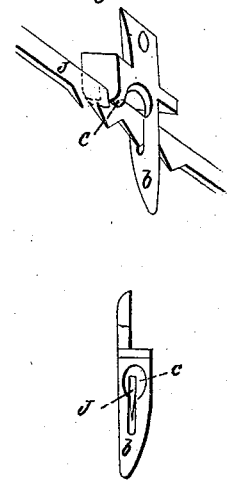

The general construction of the reel resembles those in common use, the only difference being that one set of the arms are longer than the other—viz., that which carries the sweeping-board. This is for the purpose of allowing said board to approach the platform near enough to sweep off the cut grain, while the other parts of the reel should be so constructed as to specially avoid this. The platform itself is securely framed to the rear of the frame A, and should be in length adapted to the swath which it is intended to cut. The extreme end of the platform is supported by a small wheel, V, which runs upon the ground. A longitudinal piece, W, is framed to that end of the platform in the grain, to which uprights X, for supporting the reel, and a guide-board, Y, in red dotted lines, Fig. 1, made somewhat in the form of a mold-board, for separating that part of the grain which is to be cut from the standing grain and directing it toward the cutters. Another guide, Z, at the other end of the platform, performs a similar directing function at that end. The front edge of the platform is suitably provided with guards or fingers $b$, for protecting the cutters, and the opening in these fingers, through which the cutter-bar J and cutters thereon pass, as seen in Fig. 3, is sufficiently large to prevent the said bar or cutters from touching in them. Immediately in rear of the cutter-bar, at the point where in other machines there is always an accumulation of straw, grass, fiber, or gummy matter, which clogs the cutter-bar and causes the machine to run very hard, I enlarge this space, so that anything passing behind the bar will immediately drop out. The cutter-bar is guided and controlled by boxes $c$, placed intermediately at suitable distances between the guards, so that the guards perform the duty they are specially designed for, and are relieved from the duty of controlling the cutters or cutter-bar, in the performance of which they materially detract from the efficiency of the machine. The supporting and directing of the cutters and cutter-bar is done where there is no cutting done, and by this means the short particles of grass, fiber, or gum are not encountered to clog the machine, and where the cutting is done there are no parts in contact into which this clogging material can get. The cutters themselves may be of any of the usual well-known forms.

The hinged apron in rear of the platform may be the platform itself or a portion of it, and may be raised and lowered from any other moving portion of the machine than the one described; but these I should consider the equivalents of my combinations for doing the same thing.

Having thus fully described the nature of my invention, what I claim therein as new, and desire to secure by Letters Patent, is—

1. Making the ground or driving wheel with a conical tread, to counteract the tendency of the machine to run into the uncut grain, to prevent the side draft, and to better balance the machine by throwing the heft to the outside or from the uncut grain, substantially as described.

2. So hinging the platform immediately in rear of the cutters and giving it a rising-and-falling motion by means of the cam and lever, or their equivalents, when said motions are made to conform to the motions of the reel or rake, to retain and then facilitate the discharge of the cut grain from the platform in bunches, substantially as described.

URIAH H. GOBLE.

Witnesses:
SAMUEL PARSONS,
J. B. POLLOCK.